Feb. 19, 1924.
J. A. TUBBS
TRAP
Filed Feb. 7, 1922
1,484,363
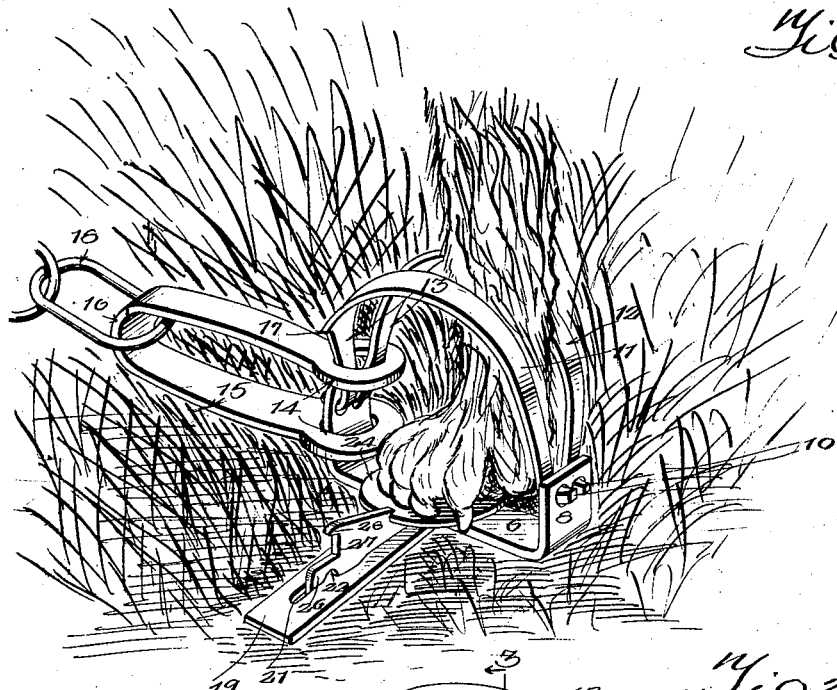
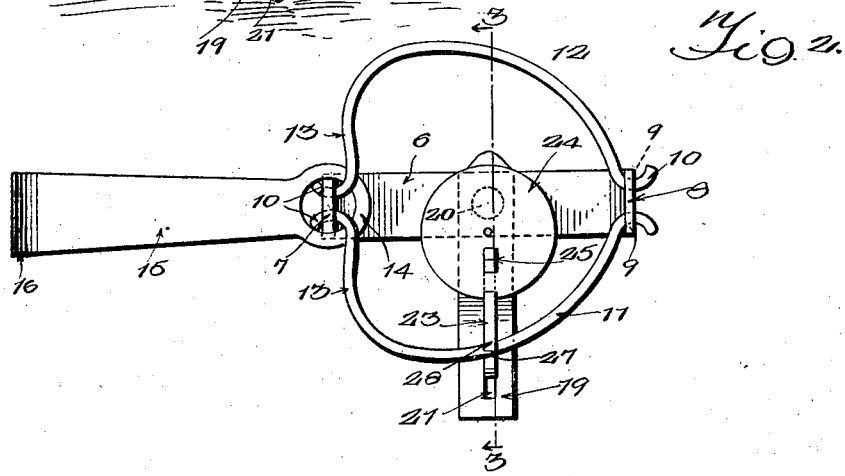
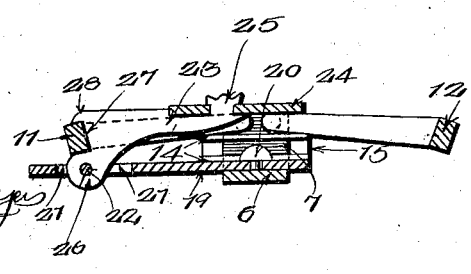
WITNESSES
INVENTOR
JOHN A. TUBBS,
BY
ATTORNEYS Patented Feb. 19, 1924.

1,484,363

UNITED STATES PATENT OFFICE.

JOHN ANDERSON TUBBS, OF ELLIS, KANSAS.

TRAP.

Application filed February 7, 1922. Serial No. 534,703.

*To all whom it may concern:*

Be it known that I, JOHN A. TUBBS, a citizen of the United States, and resident of Ellis, in the county of Ellis and State of Kansas, have invented certain new and useful Improvements in Traps, of which the following is a specification.

My invention has reference to the class of fishing and trapping or animal husbandry, and more particularly to traps for catching various animals or rodents, such as rats, bob-cats, and numerous other animals.

The invention further relates to traps of that class known as steel traps, and among the objects of the invention are to improve the trigger or latch construction of the trap so as to render it more positive, quicker and more efficient in operation, and more especially when covered up with dirt, snow or other material; which will catch higher up on the leg of the animal; to obviate the objectionable feature of the latch coming up with the jaw and over it between the two jaws in such a manner as to help or permit the animal to get its foot free or out of the trap, especially when it steps more to the trigger side of the trap; to render the trap less likely to freeze, there being nothing in the way, especially of the jaws, when the trigger or latch is pressed down, with the result that inaction of the trap is guarded against, and release and actuation thereof, and thus, catching of the animal insured, and to generally enhance, improve and increase the utility and value, and cheapen the construction of devices to which the invention appertains.

A still further object of the invention is to improve the trigger or latch construction, simplifying it and facilitating the setting and release of the trap and closing action of the jaws, and it consists in certain peculiarities of the construction, novel arrangement and operation of the various parts as will be hereinafter more fully set forth and specifically claimed.

In the accompanying drawing;

Figure 1 is a perspective view of the improved trap and showing the same in position when in use and the jaws released and sprung to catch the leg of an animal.

Figure 2 is a plan view of the trap in a set position, and

Figure 3 is a sectional view taken on the line 3—3 of Figure 2 and looking in the direction indicated by the arrows.

Referring to the drawings in detail, in which for sake of illustration, is shown the preferred embodiment of the invention and in which like reference characters designate corresponding parts throughout the several views, the improved trap is shown as comprising a substantially U-shaped base portion 6, said base being in the form of a strip of relatively stiff metal such as sheet iron or steel or cast material having upturned ends 7 and 8 each provided with a pair of adjacent and slightly spaced apart apertures 9 adapted to pivotally receive therein in the usual manner the reduced outturned and curved free extremities 10 of the trap jaws 11 and 12. The jaws 11 and 12 are of the usual substantially semi-circular, inverted U-shaped or yoke shaped conformation with the intermediate portions twisted or bent angularly with respect thereto, as particularly shown in Figure 3 of the drawings.

Engaged with the upturned end 7 and the adjacent reduced portions 13 of the jaws 11 and 12 are the enlarged rings or eye portions 14 formed at the extremities of a relatively strong V-shaped spring 15 bent intermediately to form the bight portion 16 and having its ends tapered, said spring being formed of a strip of spring steel or the like and having the arms thereof adapted to normally spring apart with considerable force. The reduced portion 13 of the jaws 11 and 12 are provided with shoulders 17 facing downwardly so as to limit the opening of the spring 13 or the arms thereof, the rings or eyes 14 having sufficiently large apertures or holes to freely slide over the adjacent pivoted ends of the jaws 11 and 12 and the corresponding upturned portion 7 so as to bring the jaws together in clamping engagement in an upright position. The spring 15 is also adapted to receive at its bight portion 16, a chain or other flexible connection such as indicated at 18 whereby the trap may be anchored or connected with a drag as is customary in the art. A drag is often used in order to trace the trail of the animal and in order to prevent it from gnawing off a foot and escaping.

In order to provide for the setting of the trap and release of the jaws so that the same will move together whereby to catch an animal, there is mounted upon the base 6 at the intermediate or bight portion thereof and preferably centrally between its ends, so as to extend at right angles therefrom and in a plane parallel thereto, a strip or bar 19 riveted or otherwise adjustably fastened upon the base as indicated at 20 and having a longitudinal slot 21 with an intermediate and tranverse pivot 22, though preferably produced by spaced slots leaving the intermediate portion to form the pivot. The trigger or latch includes a trigger member proper in the form of an arm 23 having a trigger plate or thread plate 24 riveted or otherwise secured at the free inner end thereof, as indicated at 25, or in any other suitable manner, common in the art, and having its outer end projecting downwardly with spaced portions providing an open lug or ear 26 engaged to swing on the pivot 22. Above the lug or ear 26 the trigger is provided with a recess 27 producing an overlying or projecting detent 28 adapted when the spring 15 is depressed and the jaws swung open in the manner shown in Figures 2 and 3 of the drawings from the position shown in Figure 1 to engage the intermediate portion of the jaw 11 with the tread plate 24 on the free end of the trigger slightly elevated from the base and the strip 19 in order to properly engage said jaw and resist the tendency of the same together with the jaw 12 to move to engaging position under the action of the spring 15.

In this manner, the trap is set and may be covered up as usual if desired, but upon the animal stepping or treading upon the trigger and more particularly the tread plate 24 thereof, the detent 28 will be released upon the trigger moving on its pivot 22 in swinging downwardly, thus permitting the spring 15 to instantly act upon the jaws 11 and 12 to catch the leg of an animal as indicated in Figure 1. Of course, it is to be understood that the separation or springing apart of the jaws of the spring 15 and moving upwardly upon the reduced portions 13 of the jaws as far as the shoulders 17, will cause this operation, and since there is no latch to come up and over the jaws, the animal will be prevented from getting its foot out instead of being helped or assisted as usual in traps as now constructed, where such provision exists together with the objections thereto. Furthermore, by having the latch extend under the jaw as distinguished from traps which have the latch extending over the top of one jaw, the operation is rendered more positive and quicker and the trap will tend to catch higher up on the leg of the animal especially when it steps more to the trigger side of the trap. In addition, it is harder or more difficult for the trap to freeze, this being less likely to occur, especially when compared to present traps when the trap is covered up with dirt, snow or other matter as is common in the art. Furthermore, there is nothing in the way, especially of the jaws, when the trigger or latch is pressed down, with the result that inaction of the trap is guarded against and release and actuation thereof, and thus the catching of the animal is insured.

In view of the foregoing, it is thought that the operation of the device will be readily understood. However, it is to be understood that the trigger or latch, and more especially the detent thereof, may be constructed or made to work several ways, and either from or on the inside or outside, as of the jaw, and that changes in the construction and operation, and details of the parts may be made without departing from the spirit of the invention, so long as the same are included within the scope of the device as claimed. The form shown, however, is preferred, as the most simple and as considerably reducing the number of parts over the old constructions, while at the same time making it nearly impossible for an animal to trip the trap without being caught. It is to be understood that the releasing means formed by the trigger or latch may be employed in connection with traps having one jaw as well as two jaws without modifications, except as to the specific trap in connection with which the catch is used.

Having thus described the invention what I claim is:—

A trap of the class described comprising a base, a pair of curved jaws having their extremities pivoted adjacent to each other at the ends of the base and their intermediate portions angularly twisted, a spring connected with the base and a pair of the adjacent ends of the jaws and tending to normally close said jaws, a bar secured at one end to the base and projecting outwardly at right angles therefrom, a trigger pivoted near the outer end of the bar and having a tread plate at the inner end thereof, said trigger having a notch in radial alinement with and above the pivot, said notch providing top and bottom walls to receive the intermediate twisted portion of one jaw, said portion of the jaw radially alining with the pivot, snugly fitting the notch, and locked against movement by the top and bottom walls of the notch whereby accidental displacement of the jaw from the notch is prevented, the jaws being movable out of engagement with the notch only when the trigger is depressed to release and permit the jaws to spring together.

JOHN ANDERSON TUBBS.